United States Patent [19]

Affolter

[11] Patent Number: 4,482,903
[45] Date of Patent: Nov. 13, 1984

[54] DISK UNIT WITH RETAINING RING

[75] Inventor: Peter Affolter, Hilton, N.Y.

[73] Assignee: Eastman Kodak Company, Rochester, N.Y.

[21] Appl. No.: 506,249

[22] Filed: Jun. 20, 1983

[51] Int. Cl.³ .............................................. E01D 15/32
[52] U.S. Cl. .................................. 346/137; 346/76 L; 346/135.1; 369/284; 369/287
[58] Field of Search .................... 346/76 L, 135.1, 137

[56] References Cited

U.S. PATENT DOCUMENTS

| | | | |
|---|---|---|---|
| 2,738,073 | 3/1956 | Jepson | 210/162 |
| 3,310,861 | 3/1967 | Oddsen | 29/150 |
| 3,373,413 | 3/1968 | Treseder | 340/174.1 |
| 4,365,258 | 12/1982 | Geyer et al. | 346/137 |
| 4,403,319 | 9/1983 | Adamek et al. | 369/261 |

*Primary Examiner*—E. A. Goldberg
*Assistant Examiner*—Gerald E. Preston
*Attorney, Agent, or Firm*—Milton S. Sales

[57] ABSTRACT

This disclosure relates to an optical disk unit with two states in which the web assembly is in different circumferentially-symmetric tensions. One tension is sufficiently great to provide the desired degree of planarity when used with write/read apparatus. The other tension is significantly reduced, keeping the web assembly materials well below their elastic limits to reduce tension and prolong product life. The optical disk unit includes a flexible disk-shaped web assembly including a support web and preferably an opposed cover sheet. An annular retaining ring engages the web assembly around its periphery. The support web carries a record layer with an information storage region. The annular retaining ring includes selectively operable means for changing the state of the disk unit to adjust the web assembly tension between the two tensions. In one embodiment, the state-changing means includes a bi-stable spring having a stable condition for each of the two web assembly tensions. In its high-tension state, the spring bears against the web assembly, deforming the web assembly to increase its tension.

7 Claims, 8 Drawing Figures

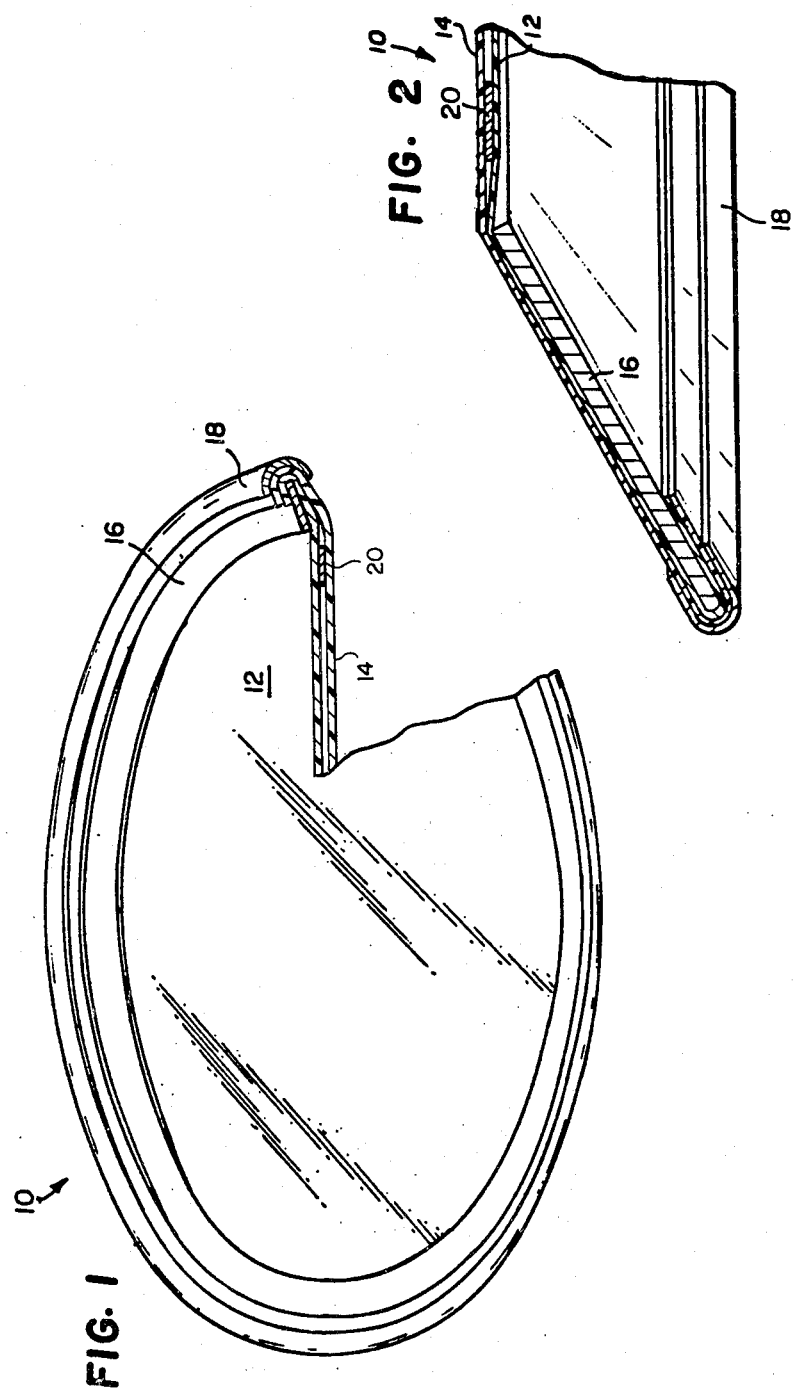

DISK UNIT WITH RETAINING RING

BACKGROUND OF THE INVENTION

1. Field of the Invention

The present invention relates to a record medium and apparatus useful in high density storage of information by optical write and/or read (hereinafter referred to as write/read) methods, and more particularly to improved configurations of optical disk units for use with optical disk write/read apparatus.

2. Description of the Prior Art

Commonly-assigned U.S. Pat. No. 4,365,258, issued Dec. 21, 1982 to F. F. Geyer and E. M. Leonard discloses several optical disk units adapted for high density storage of information. One disclosed configuration comprises (i) a flexible, disk-shaped support web carrying a record layer; (ii) a transparent disk cover sheet opposing the record layer, and (iii) an annular retaining ring for holding the support web and cover sheet, collectively referred to as the web assembly, in a relatively low circumferentially-symmetric tension and tensioned to an operating tension when drawn over a rotatable annular locating surface on the disk unit receiving structure of the optical disk write/read apparatus. Thus the disk unit can normally be kept with the web assembly in low "storage" tension, and used with the web assembly in higher "operating" tension to enhance flatness.

Preferred tensions for the disk-shaped support and cover sheet materials are from substantially zero to just below the elastic limit, or yield point, of those materials. More specifically, the preferred tension depends upon the desired degree of planarity for the particular member (i.e. size, composition, etc.) used. It is preferred that "storage" and "operating" support material tensions be below the elastic limit of the particular material; however, in certain applications some yield can be acceptable as long as surface planarity remains in the desired tolerance. In general, the tension (particularly storage tension) should be selected with respect to the support material so that the stressed material's continuous relaxation over time (i.e. material creep) is slow enough to ensure adequate spacing and planarizing tension throughout the expected product life period.

The above-described disk unit configurations perform admirably. However, it is desirable in some applications to increase the difference between the "storage" tension and the "operating" tension beyond that obtainable by drawing the web assembly over an annular locating surface. Some web materials exhibit objectionably shortened expected product life when subjected to normal "storage" tensions, due to the material's continuous relaxation over time. Yet "storage" tension cannot be decreased without adversely affecting surface planarity at "operating" tension, because the write/read apparatus is capable of increasing tensions by only a predetermined amount.

SUMMARY OF THE INVENTION

The present invention is an improvement over the disk unit described in U.S. Pat. No. 4,365,258. It provides an optical disk unit with two states in which the web assembly is in different circumferentially-symmetric tensions. One tension is sufficiently great to provide the desired degree of planarity when used with write/read apparatus. The other tension is significantly reduced, keeping the web assembly materials well below their elastic limits to reduce relaxation and prolong product life.

An optical disk unit according to the invention includes a flexible disk-shaped web assembly including a support web and preferably an opposed cover sheet. An annular retaining ring engages the web assembly around its periphery. The support web carries a record layer with an information storage resion. The annular retaining ring includes selectively operable means for changing the state of the disk unit to adjust the web assembly tension between the two tensions mentioned in the preceding paragraph. In the preferred embodiment, the state-changing means includes a bi-stable spring having a stable condition for each of the two web assembly tensions. In its high-tension state, the spring bears against the web assembly, deforming the web assembly to increase its tension.

The invention and its objects and advantages, will become more apparent in the detailed description of the preferred embodiment presented below.

BRIEF DESCRIPTION OF THE DRAWINGS

The description of preferred embodiment refers to the attached drawings wherein:

FIG. 1 is a fragmented bottom perspective, schematic view of an optical disk unit according to the present invention;

FIG. 2 is an enlarged side sectional view of a portion of the optical disk unit of FIG. 1;

DESCRIPTION OF THE PREFERRED EMBODIMENT

Figure 3:
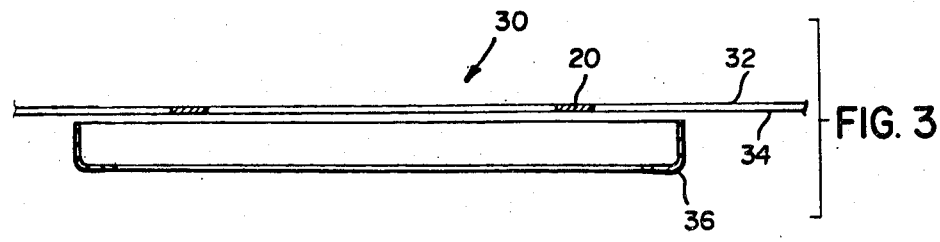
FIGS. 3-7 are sectional views which sequentially illustrate a method for manufacturing the optical disk unit of FIGS. 1 and 2.

Referring to schematic FIGS. 1 and 2, an optical disk unit 10 web assembly which includes a flexible, disk-shaped support web 12 having a heat deformable, dye binder record layer (and other appropriate layers) overlying a reflective surface of the support. The web assembly preferably also includes a continuous, flexible, disk-shaped cover sheet 14 which is substantially transparent with respect to the write and/or read optical wavelength suitable for use with the record layer. The diameter of cover sheet 14 corresponds generally to the diameter of support web 12.

Cover sheet 14 and disk-shaped support web 12 are retained in circumferentially-symmetric tension by an annular retaining ring having inner and outer members 16 and 18, respectively, which engage support web 12 and cover sheet 14 substantially continuously around their respective annular peripheral portions. The support web and the cover sheet are held apart by an annular spacer 20. The record layer on support web 12 has a predetermined annular information storage region radially inwardly of the spacer. Reference is made to aforementioned U.S. Pat. No. 4,365,258 for a description of useful and preferred materials and characteristics for the support web and the cover sheet.

It is preferred that the cooperative engagement between disk-shaped support 12, cover sheet 14, and the retaining ring (including spacer 20) significantly seal the space between the record layer on support web 12 and the opposed surface of cover sheet 14. Although not included in the illustrated embodiment, the optical disk unit may have a central right hub including spacer means for maintaining proper spacing between the record layer and the cover sheet.

Referring more specifically to the retaining ring, inner ring member 16 is an annual steel washer which has been conically deformed, and which is restrained from returning to its flat configuration by outer ring member 18. The material of which inner ring member 16 is made is preferably cold rolled high-grade steel (approximately 0.8% carbon content). Spring metal may be used, but is not believed necessary because the expected number of flexures during product life will be relatively small.

The preferred assembly operation, or manufacturing method, is schematically illustrated in FIGS. 3-7. A composite 30 is held above an annular clamping ring 36, as shown in FIG. 3, in circumferentially-symmetric tension. Composite 30 includes a web 32 from which support web 12 (FIG. 2) is cut, a web 34 from which cover sheet 14 (also FIG. 2) is cut, and an intermediate annular spacer 20. Webs 32 and 34 are illustrated in FIGS. 3-8 by single lines because of space limitations and for clarity.

Figure 4:
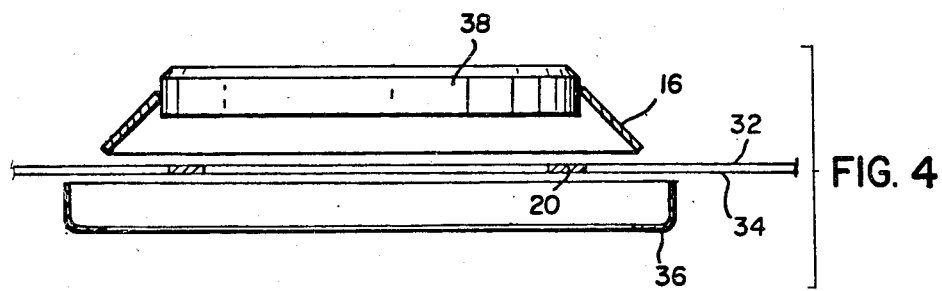
Figure 5:
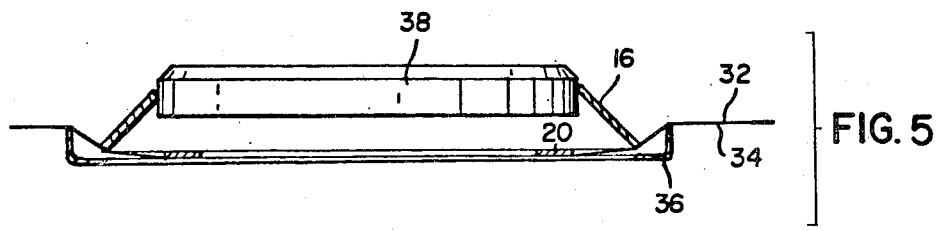
Figure 6:
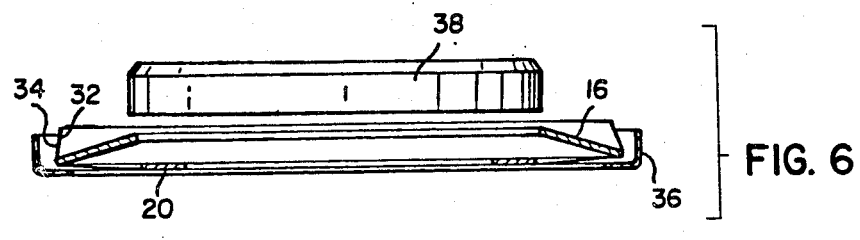

Referring to FIG. 4, an inner ring member 16 is aligned with clamping ring 36, with composite 30 therebetween. Ring member 16 has been pressed upon a plug 38 to conically deform the ring member, reducing its outer diameter. The plug and ring member are lowered into clamping ring 36 as shown in FIG. 5, and then the plug is removed, FIG. 6.

Removal of plug 38 from inner ring member 16 permits the ring member to spring back towards its flat, undeformed configuration until restrained by the upturned flange of clamp ring 36. Web composite 30 is captured between ring member 16 and clamp ring 36, and can be trimmed without losing its tension.

Figure 7:
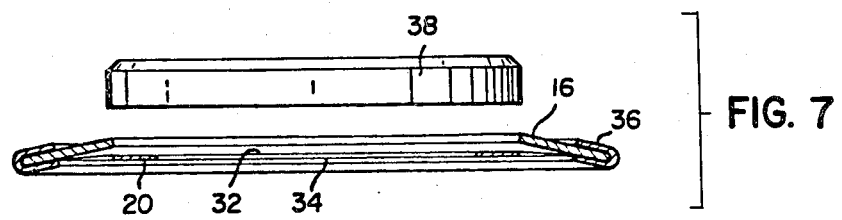
Figure 8:
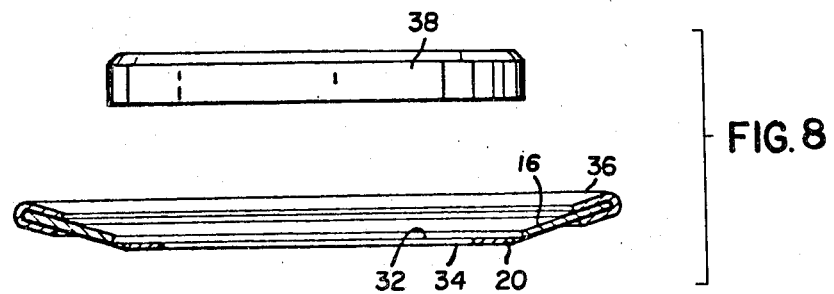
FIG. 8 is a sectional view showing the optical disk unit in its tensioned state.

Crimping the clamp ring to form outer ring member 18, FIG. 7, completes the assembly process. The disk unit is in a state of significantly reduced web assembly tension with the web assembly tensions well below their elastic limits.

To increase web assembly tension, inner ring member 16 is pushed "through" outer ring member 18. The inner ring member snaps to its second stable condition shown in FIG. 8, and pushes on the web assembly. This increases the web assembly tension sufficiently to provide the desired degree of planarity when the disk unit is used with write/read apparatus.

The invention has been described in detail with particular reference to a preferred embodiment thereof, but it will be understood that variations and modifications can be effected within the spirit and scope of the invention. For example, although the invention has been described in an embodiment wherein the web assembly includes both a support web and a cover sheet, the invention is useful with optical disk units which have only an edge constrained support web and no cover sheet.

I claim:

1. An optical disk unit for use with write/read apparatus, said disk unit comprising:
 a flexible, disk-shaped web assembly carrying a record layer, said web assembly having an information storage region and an annular peripheral region radially outward of said storage region;
 an annular retaining ring engaging said peripheral region of said web assembly; and
 means forming part of said retaining ring for selectively adjusting said disk unit between two states, in one of said states the web assembly tension is sufficiently great to provide a desired degree of planarity when said disk unit is used with the write/read apparatus, and in the other of said states the web assembly tension is significantly reduced to keep said web assembly well below its elastic limit.

2. An optical disk unit as defined in claim 1 wherein said adjusting means comprises a bi-stable spring having a stable condition for each of said disk unit states.

3. An optical disk unit as defined in claim 2 wherein said bi-stable spring bears against said web assembly with web-deforming force in only said one disk unit state.

4. An optical disk unit as defined in claim 1 wherein:
 said annular retaining ring includes an outer ring member; and
 said adjusting means comprises a bi-stable spring having a stable condition for each of said disk unit states, said spring comprising a conically deformed annular steel washer which is restrained from returning to a flat configuration by said outer ring member, and which can be pushed through said outer ring member to snap between its stable conditions.

5. An optical disk unit for use with write/read apparatus, said disk unit comprising:
 a flexible, disk-shaped web assembly including a support web and an opposed cover sheet;
 a record layer with an information storage region on said support web;
 an annular peripheral region of said web assembly radially outward of said storage region; and
 an annular retaining ring engaging said peripheral region of said web assembly, said retaining ring including means for adjusting the tension of said web assembly between a first tension sufficiently great to provide a desired degree of planarity when said disk unit is used with the write/read apparatus, and a second, reduced tension for keeping said web assembly well below its elastic limit.

6. An optical disk unit as defined in claim 5 wherein said adjusting means comprises a bi-stable spring having a stable condition for each of said first and second web assembly tensions.

7. An optical disk unit as defined in claim 6 wherein:
 said annular retaining ring includes an outer ring member; and
 said bi-stable spring comprises a conically deformed annular steel washer which is restrained from returning to a flat configuration by said outer ring member, and which can be pushed through said outer ring member to snap between its stable conditions.

* * * * *